(12) United States Patent
Goto

(10) Patent No.: US 12,371,026 B2
(45) Date of Patent: Jul. 29, 2025

(54) VEHICLE TRAVELING ASSISTANCE DEVICE

(71) Applicant: TOYOTA JIDOSHA KABUSHIKI KAISHA, Toyota (JP)

(72) Inventor: Kuniaki Goto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 18/489,981

(22) Filed: Oct. 19, 2023

(65) Prior Publication Data
US 2024/0227813 A1 Jul. 11, 2024

(30) Foreign Application Priority Data
Jan. 10, 2023 (JP) ................. 2023-001632

(51) Int. Cl.
*B60W 30/18* (2012.01)
*B60W 50/14* (2020.01)
*B60W 60/00* (2020.01)
*G08G 1/00* (2006.01)

(52) U.S. Cl.
CPC .... *B60W 30/18163* (2013.01); *B60W 60/001* (2020.02); *G08G 1/22* (2013.01); *B60W 2554/802* (2020.02)

(58) Field of Classification Search
CPC ......... B60W 30/18163; B60W 60/001; B60W 2552/53; B60W 2554/4041; B60W 30/12; B60W 10/04; B60W 10/18; B60W 10/20; B60W 30/143; B60W 30/16; B60W 2420/54; B60W 2520/10; B60W 2554/802; B60W 2050/146; B60W 2554/4042; G08G 1/22; G08G 1/09; G08G 1/16; G08G 1/167
USPC ........................................................... 701/25
See application file for complete search history.

(56) References Cited

U.S. PATENT DOCUMENTS

| | | | |
|---|---|---|---|
| 2019/0276028 A1* | 9/2019 | Toda | B60W 50/0097 |
| 2020/0086890 A1* | 3/2020 | Ikeda | G09G 5/37 |
| 2020/0180639 A1 | 6/2020 | Mizoguchi | |
| 2021/0253103 A1* | 8/2021 | Kumar | B60W 60/001 |
| 2022/0203992 A1* | 6/2022 | Taniguchi | G08G 1/167 |

FOREIGN PATENT DOCUMENTS

JP 2020-095336 A 6/2020

* cited by examiner

*Primary Examiner* — Rachid Bendidi
*Assistant Examiner* — Hossam M Abd El Latif
(74) *Attorney, Agent, or Firm* — SoraIP, Inc.

(57) ABSTRACT

The vehicle traveling assistance device sets a route in which the own vehicle enters in front of the preceding vehicle or the leading vehicle after overtaking the preceding vehicle or the leading vehicle when there is no other vehicle on the traveling route within a first distance ahead of the preceding vehicle or the leading vehicle of the vehicle when there is a preceding vehicle traveling in front of the own vehicle at a running speed equal to or lower than a predetermined speed or a convoy of a plurality of vehicles including the preceding vehicle on the traveling route of the own vehicle.

1 Claim, 7 Drawing Sheets

VEHICLE TRAVELING ASSISTANCE DEVICE

CROSS-REFERENCE TO RELATED APPLICATION

This application claims priority to Japanese Patent Application No. 2023-001632 filed on Jan. 10, 2023, incorporated herein by reference in its entirety.

BACKGROUND

1. Technical Field

The disclosure relates to a vehicle traveling assistance device.

2. Description of Related Art

There is known a vehicle traveling assistance device configured to enable an own vehicle to continue traveling without stopping the own vehicle, when a lane-restricted section is present on a travel route of the own vehicle while the own vehicle is performing automated traveling, by changing the lane of the own vehicle to an adjacent lane, and returning the own vehicle to the original traveling lane after the own vehicle passes the lane-restricted section (e.g., see Japanese Unexamined Patent Application Publication No. 2020-95336 (JP 2020-95336 A)).

SUMMARY

The above-described conventional vehicle traveling assistance device is not configured to enable the own vehicle to continue traveling without stopping the own vehicle or decelerating the own vehicle to an extremely low speed, when a stopped vehicle or a vehicle traveling at an extremely low speed is present on the travel route of the own vehicle.

An object of the disclosure is to provide a vehicle traveling assistance device capable of allowing the own vehicle to continue traveling without stopping the own vehicle or decelerating the own vehicle to an extremely low speed when a stopped vehicle or a vehicle traveling at an extremely low speed is present on the travel route of the own vehicle.

A vehicle traveling assistance device according to the disclosure is equipped with a control device that sets a travel route of an own vehicle. The control device is configured to, when a preceding vehicle or a train of a plurality of vehicles including the preceding vehicle, traveling immediately ahead of the own vehicle at a traveling speed no greater than a predetermined speed, is present on a traveling route of the own vehicle, and further no other vehicle is traveling on the traveling route within a range of a first distance forward from the preceding vehicle or a leading vehicle of the train of vehicles, set, as the travel route, a route in which, after overtaking the preceding vehicle or the leading vehicle, the own vehicle enters ahead of the preceding vehicle or the leading vehicle.

Even when a stopped vehicle, or a preceding vehicle or a train of vehicles, traveling at an extremely low speed, is present on a travel route of the own vehicle, as long as there is sufficient space for the own vehicle to enter ahead of the preceding vehicle or the leading vehicle of the train of vehicles, the own vehicle can be made to overtake the preceding vehicle or the train of vehicles and enter the space ahead of the preceding vehicle or the leading vehicle of the train of vehicles, thereby enabling the own vehicle to continue traveling without stopping the own vehicle or decelerating the own vehicle to an extremely low speed.

According to the vehicle traveling assistance device of the disclosure, when a preceding vehicle or a train of vehicles, traveling at a speed no greater than a predetermined speed, is present on the travel route of the own vehicle, and no other vehicle is present on the travel route within the range of the first distance ahead of the preceding vehicle or the leading vehicle of the train of vehicles, a route is set as the travel route for the own vehicle to enter ahead of the preceding vehicle or the leading vehicle after overtaking the preceding vehicle or the leading vehicle. Thus, causing the own vehicle to travel along the travel route set in this way enables the own vehicle to continue to travel without stopping the own vehicle or decelerating the own vehicle to an extremely low speed when a stopped vehicle or a vehicle traveling at an extremely low speed is present on the travel route of the own vehicle.

Also, in the vehicle traveling assistance device according to the disclosure, the control device may be configured to, when the route for the own vehicle to enter ahead of the preceding vehicle or the leading vehicle is set as the travel route, cause the own vehicle to automatically travel along the travel route that is set.

According to the vehicle traveling assistance device of the disclosure, after the travel route is set, the own vehicle automatically travels along the travel route. Thus, when a stopped vehicle or a vehicle traveling at an extremely low speed is present on the traveling route of the own vehicle, the own vehicle can continue to travel without stopping the own vehicle or decelerating the own vehicle to an extremely low speed.

Further, in the vehicle traveling assistance device according to the disclosure, the control device may be configured to, when the route for the own vehicle to enter ahead of the preceding vehicle or the leading vehicle is set as the travel route, present the travel route that is set to an operator of the own vehicle.

According to the vehicle traveling assistance device of the disclosure, after the travel route is set, the travel route is presented to the operator of the own vehicle. Thus, the operator of the own vehicle can know of the travel route that is set, and by causing the own vehicle to travel along this travel route, the own vehicle can continue traveling without stopping the own vehicle or decelerating the own vehicle to an extremely low speed when a stopped vehicle or a vehicle traveling at an extremely low speed is present on the travel route of the own vehicle.

In the vehicle traveling assistance device according to the disclosure, the control device may be configured to, when the travel route is a route entering a branch lane branching from a travel lane in which the own vehicle is traveling and a distance between an entrance of the branch lane and the own vehicle becomes no greater than a predetermined entry distance, the preceding vehicle or the train of vehicles is present on the travel route, and further no other vehicle is present on the travel route within the range of the first distance ahead of the preceding vehicle or the leading vehicle of the train of vehicles, and a distance between the preceding vehicle or the leading vehicle and an end point of a connection portion of the branch lane and the travel lane is a second distance or more, set, as the travel route, a route in which, after overtaking the preceding vehicle or the leading vehicle, the own vehicle enters ahead of the preceding vehicle or the leading vehicle.

According to the vehicle traveling assistance device of the disclosure, when the original travel route is a route that enters into a branch lane, and a stopped vehicle or a vehicle traveling at an extremely low speed is present on the travel route of the own vehicle, the own vehicle can continue traveling without stopping the own vehicle or decelerating the own vehicle to an extremely low speed.

Components of the disclosure are not limited to the embodiments of the disclosure described below with reference to the drawings. Other objects, other features, and accompanying advantages of the disclosure will be readily understood from the description of the embodiments of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
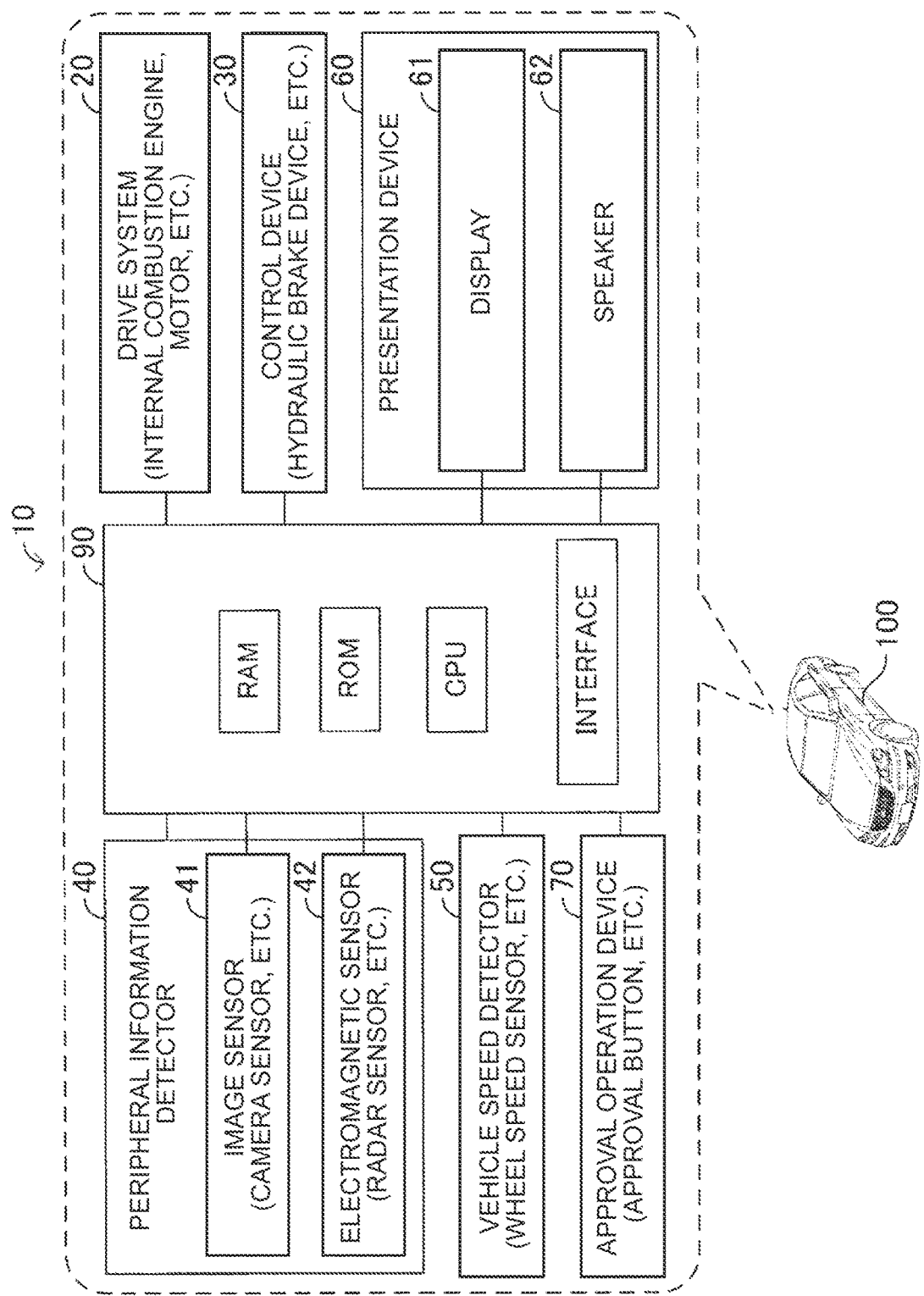
FIG. 1 is a diagram showing a vehicle traveling assistance device according to an embodiment of the present disclosure.

Hereinafter, a vehicle traveling assistance device according to an embodiment of the present disclosure will be described with reference to the drawings. FIG. 1 shows a vehicle traveling assistance device 10. The vehicle traveling assistance device 10 is mounted on the own vehicle 100. Hereinafter, the vehicle traveling assistance device 10 will be described by taking as an example a case where the operator of the own vehicle 100 is a person who gets into the own vehicle 100 and drives the own vehicle 100 (that is, the driver of the own vehicle 100).

However, the operator of own vehicle 100 may be a person who remotely drives own vehicle 100 without getting on own vehicle 100 (that is, a remote operator of own vehicle 100). When the operator of the own vehicle 100 is a remote operator, the vehicle traveling assistance device 10 is mounted on the own vehicle 100 and remote control equipment installed outside the own vehicle 100 for remotely driving the own vehicle 100. Further, the functions of the vehicle traveling assistance device 10 described below are shared between the vehicle traveling assistance device 10 mounted on the own vehicle 100 and the vehicle traveling assistance device 10 mounted on the remote control equipment.

As shown in FIG. 1, the vehicle traveling assistance device 10 includes an electronic control unit (ECU) 90 as a control device. The ECU 90 has a microcomputer as its main part. The microcomputer includes storage media such as CPU, ROM, RAM and non-volatile memory, interfaces and the like. The CPU implements various functions by executing instructions, programs, or routines stored in the storage medium. In particular, in this example, the vehicle traveling assistance device 10 stores programs for implementing various controls executed by the vehicle traveling assistance device 10 in a storage medium.

The vehicle traveling assistance device 10 may be configured so that the program stored in the recording medium can be updated through wireless communication (for example, Internet communication) with an external device.

The vehicle traveling assistance device 10 is configured to execute follow-up driving control for causing the own vehicle 100 to follow the preceding vehicle. The follow-up travel control is a control that automatically or autonomously accelerates and decelerates the own vehicle 100 to follow the preceding vehicle, even if the driver of the own vehicle 100 does not operate the own vehicle 100. Therefore, the vehicle traveling assistance device 10 is a device for automatically or autonomously driving the own vehicle 100 without the user of the own vehicle 100 performing a driving operation on the own vehicle 100.

As shown in FIG. 1, an own vehicle 100 is equipped with a driving device 20 and a braking device 30. The driving device 20 comprises, for example, an internal combustion engine and/or an electric motor. Also, the braking device 30 includes, for example, a hydraulic braking device. The driving device 20 and the braking device 30 are electrically connected to the ECU 90. The ECU 90 (that is, the vehicle traveling assistance device 10) controls the operation of the driving device 20 and the braking device 30. This allows the ECU 90 to accelerate or decelerate the own vehicle 100.

Further, the own vehicle 100 is also equipped with a peripheral information detection device 40. The peripheral information detection device 40 includes an image sensor 41 such as a camera sensor and an electromagnetic wave sensor 42 such as a radar sensor. The image sensor 41 and the electromagnetic wave sensor 42 are electrically connected to the ECU 90. The ECU 90 (that is, the vehicle traveling assistance device 10) acquires image data of the surroundings including the front of the own vehicle 100 by the image sensor 41 as the surrounding information IS. The ECU 90 acquires surrounding target object data including the front of the own vehicle 100 from the electromagnetic wave sensor 42 as surrounding information IS. The ECU 90 (that is, the vehicle traveling assistance device 10) detects a preceding vehicle or the like based on the surrounding information IS.

Figure 2:
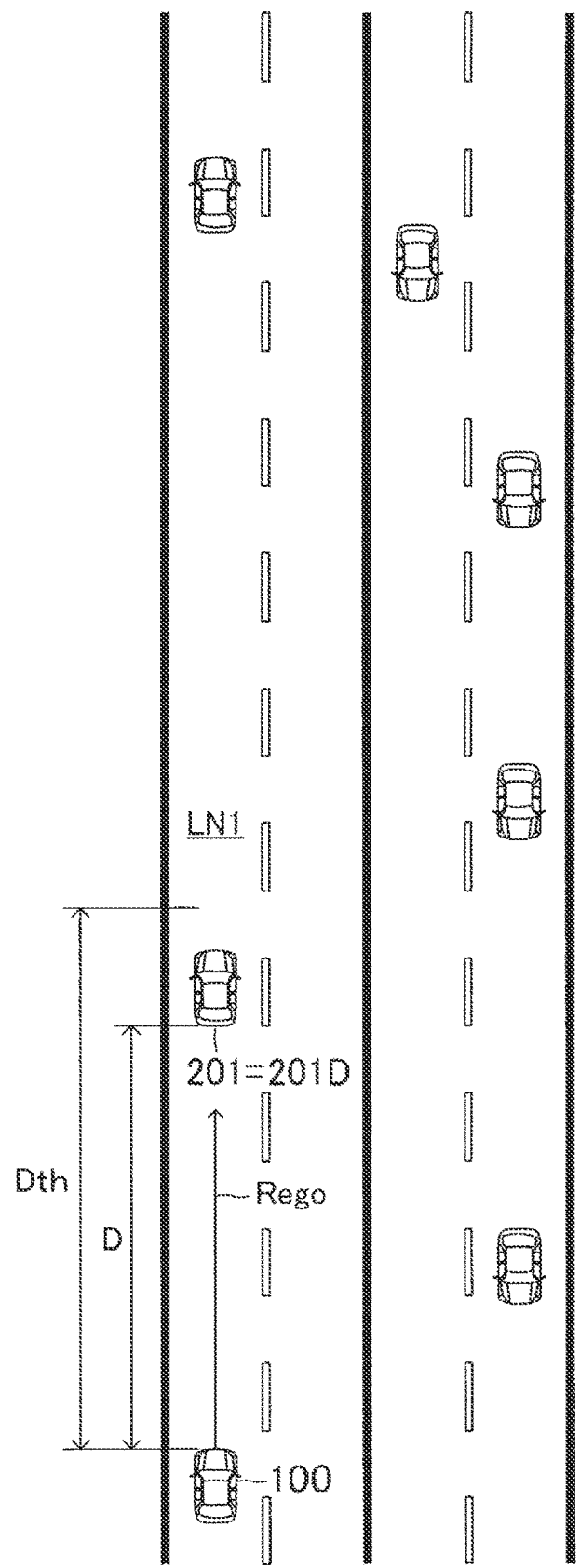
FIG. 2 is a diagram showing a scene in which a preceding vehicle exists in front of the own vehicle.

As shown in FIG. 2, in this example, the vehicle traveling assistance device 10 is the other vehicle 201 that runs in front of the own vehicle 100 on the driving route Rego of the own vehicle 100. The vehicle traveling assistance device 10 detects another vehicle 201 traveling within a predetermined distance (predetermined distance Dth) from the own vehicle 100 as a preceding vehicle 201D. Further, the vehicle traveling assistance device 10 acquires the distance D between the own vehicle 100 and another vehicle 201 traveling in front of the own vehicle 100 on the traveling route Rego of the own vehicle 100 based on the surrounding information IS.

Further, the vehicle traveling assistance device 10 may be configured to be able to wirelessly communicate with vehicles around the own vehicle 100. In this case, the vehicle traveling assistance device 10 receives signals transmitted from vehicles around the own vehicle 100 and acquires the surrounding information IS based on the received signals. Furthermore, the vehicle traveling assistance device 10 may be configured to be able to receive signals transmitted from equipment installed on the side of a road or the like. In this case, the vehicle traveling assistance device 10 receives the signal transmitted from the facility and acquires the surrounding information IS based on the received signal. Furthermore, the vehicle traveling assistance device 10 may be configured to acquire information about roads around the own vehicle 100 as the surrounding information IS based on GPS signals and map information.

Figure 3:
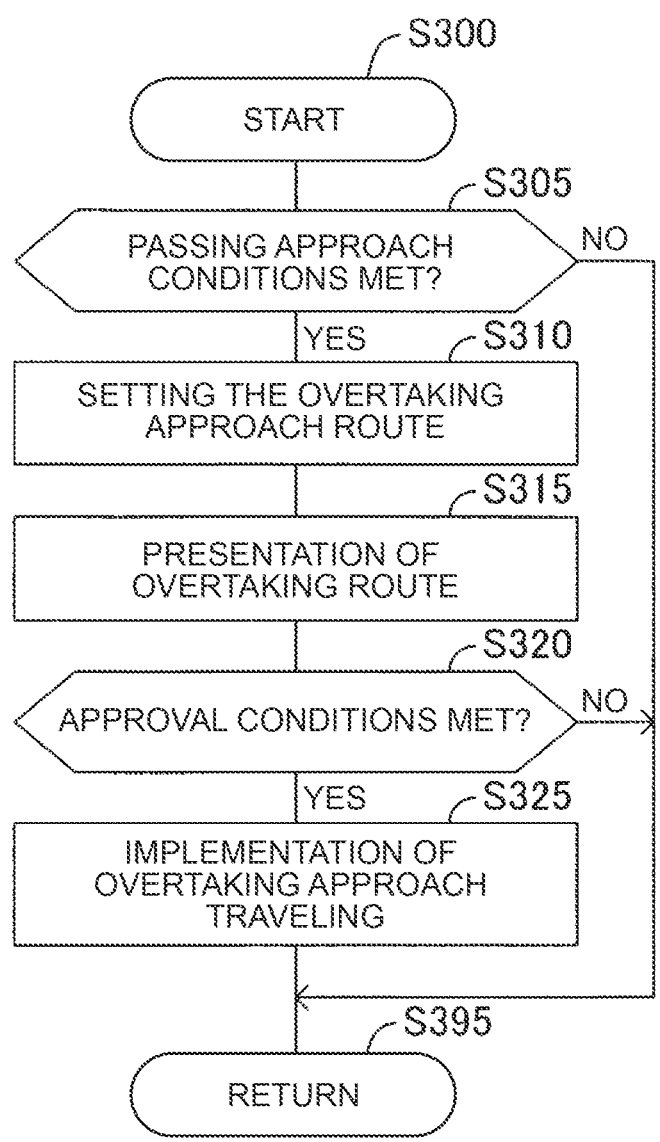
FIG. 3 is a flowchart showing a routine executed by the vehicle traveling assistance device according to the embodiment of the present disclosure.

The vehicle traveling assistance device 10 executes the routine shown in FIG. 3 at a predetermined calculation cycle when executing follow-up driving control. Accordingly, at a predetermined timing, the vehicle traveling assistance device 10 starts processing from S300 of the routine shown in FIG. 3. The vehicle traveling assistance device 10 advances the process to S305 and determines whether or not the overtaking entry condition Cx is satisfied.

In this example, the overtaking entry condition Cx is satisfied when any one of the first condition Cx_1 to the fourth condition Cx_4 is satisfied.

Figure 4:
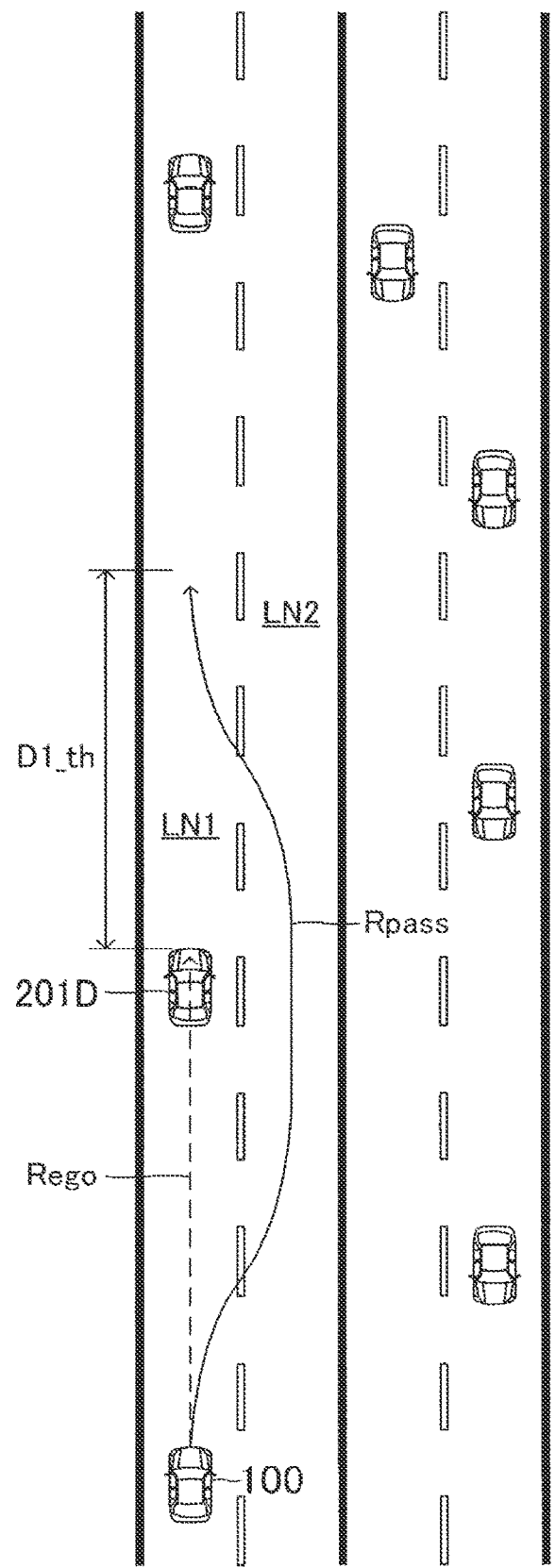
FIG. 4 is a diagram showing a scene in which there is a preceding vehicle that is stopped ahead of the own vehicle or that is traveling at an extremely low speed.

As shown in FIG. 4, the first condition Cx_1 is a condition that, when a preceding vehicle 201D traveling in front of own vehicle 100 at a traveling speed Vpre equal to or lower than a predetermined speed Vth is present on the traveling route Rego of own vehicle 100, there is no other vehicle on the traveling route Rego within a first distance D1_th ahead of the preceding vehicle 201D. More specifically, the first condition Cx_1 is a travel route Rego within a first distance D1_th ahead of the preceding vehicle 201D when a preceding vehicle 201D traveling in front of the own vehicle 100 at a travel speed Vpre equal to or lower than a predetermined speed Vth is present on the travel route Rego of the own vehicle 100, and the travel route Rego of the own vehicle 100 is not a route that enters a branch lane that branches off from the travel lane LN1 of the own vehicle 100.

Figure 5:
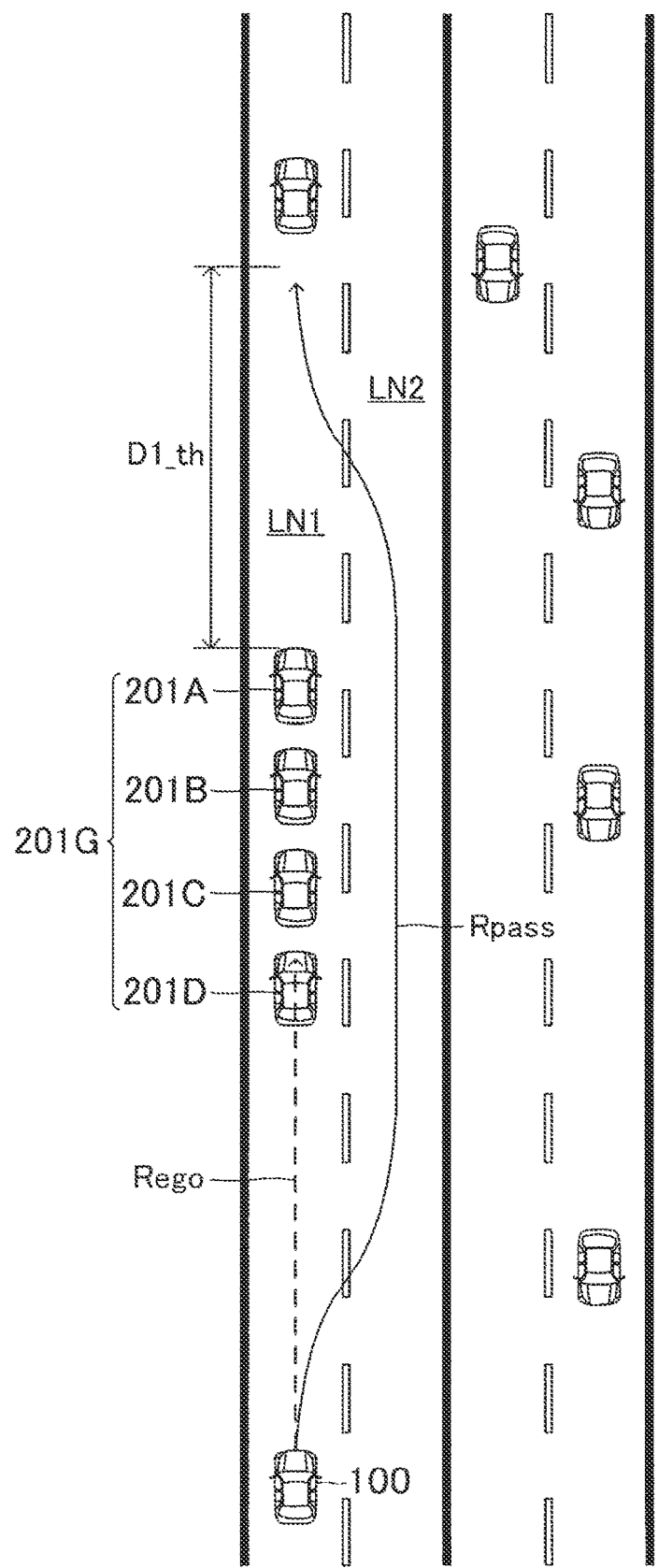
FIG. 5 is a diagram showing a scene in which there is a line of cars that are stopped or traveling at an extremely low speed in front of the own vehicle.

The second condition Cx_2 is, as shown in FIG. 5, when a convoy 201G of a plurality of vehicles 201A to 201D including a preceding vehicle 201D traveling in front of the own vehicle 100 at a travel speed Vpre equal to or lower than a predetermined speed Vth exists on the travel route Rego of the own vehicle 100, and no other vehicle exists on the travel route Rego within a first distance D1_th ahead of the leading vehicle 201A of the convoy 201G. More specifically, the second condition Cx_2 is a case where the travel route Rego of the own vehicle 100 is not a route that enters into a branch lane that branches off from the travel lane LN1 of the own vehicle 100 and a convoy 201G of a plurality of vehicles 201A to 201D including a preceding vehicle 201D traveling in front of the own vehicle 100 at a travel speed Vpre equal to or lower than a predetermined speed Vth exists on the travel route Rego of the own vehicle 100. The condition is that there is no other vehicle on the traveling route Rego within the first distance D1_th ahead of the leading vehicle 201A of the convoy 201G.

In this example, the convoy 201G is a train including a plurality of vehicles traveling or stopped with an inter-vehicle distance equal to or less than the predetermined inter-vehicle distance Dinter_th. The predetermined inter-vehicle distance Dinter_th is set to a very short distance compared to the first distance D1_th. The vehicle traveling assistance device 10 detects the convoy 201G based on the surrounding information IS.

Also, in this example, the first distance D1_th is set to a distance sufficient to allow the own vehicle 100 to change lanes from a lane adjacent to the travel lane LN1 (adjacent lane LN2) and safely enter the travel lane LN1.

More specifically, in this example, the first distance D1_th is set based on the current vehicle speed Vego and the control yaw angle $\theta$ corresponding to the vehicle speed Vego (D1=f1(Vego, $\theta$)). The own vehicle speed Vego is the traveling speed of the own vehicle 100. The control yaw angle $\theta$ is the yaw angle of the own vehicle 100 that allows the own vehicle 100 to safely change lanes at the current vehicle speed Vego. Therefore, the control yaw angle $\theta$ decreases as the vehicle speed Vego increases. The first distance D1_th is set to a larger value as the own vehicle speed Vego increases, and is set to a larger value as the control yaw angle $\theta$ decreases.

As shown in FIG. 1, the own vehicle 100 is equipped with a vehicle speed detection device 50. The vehicle speed detection device 50 includes, for example, wheel speed sensors. The vehicle speed detection device 50 is electrically connected to the ECU 90. The ECU 90 (that is, the vehicle traveling assistance device 10) acquires the traveling speed of the own vehicle 100 as the own vehicle speed Vego by the vehicle speed detection device 50.

Figure 6:
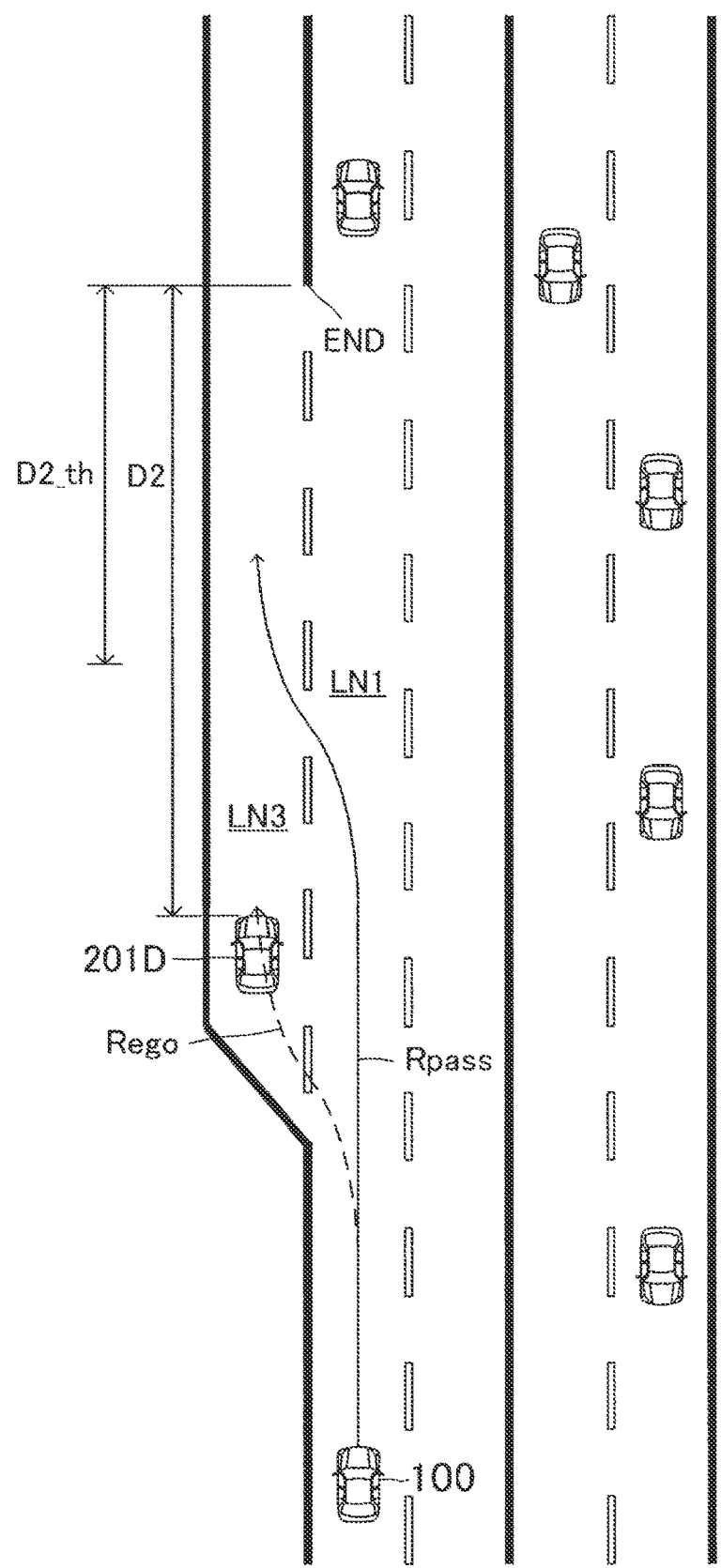
FIG. 6 is a diagram showing a scene in which there is a preceding vehicle that is stopped or traveling at an extremely low speed in the branch lane ahead of the own vehicle.

The third condition Cx_3 is, as shown in FIG. 6, when the traveling route Rego of the own vehicle 100 enters a branch lane LN3 branching from the travel lane LN1 of the own vehicle 100, and the preceding vehicle 201D is present on the traveling route Rego of the own vehicle 100 when the distance (entrance distance Dent) between the entrance of the branch lane LN3 and the own vehicle 100 becomes equal to or less than a predetermined distance (predetermined entrance distance Dent_th). There is no other vehicle on the travel route Rego within a first distance D1_th ahead of the preceding vehicle 201D, and the distance from the preceding vehicle 201D to the end point END of the connection portion between the branch lane LN3 and the travel lane LN1 (entrance end point distance D2) is greater than or equal to the second distance D2_th.

Figure 7:
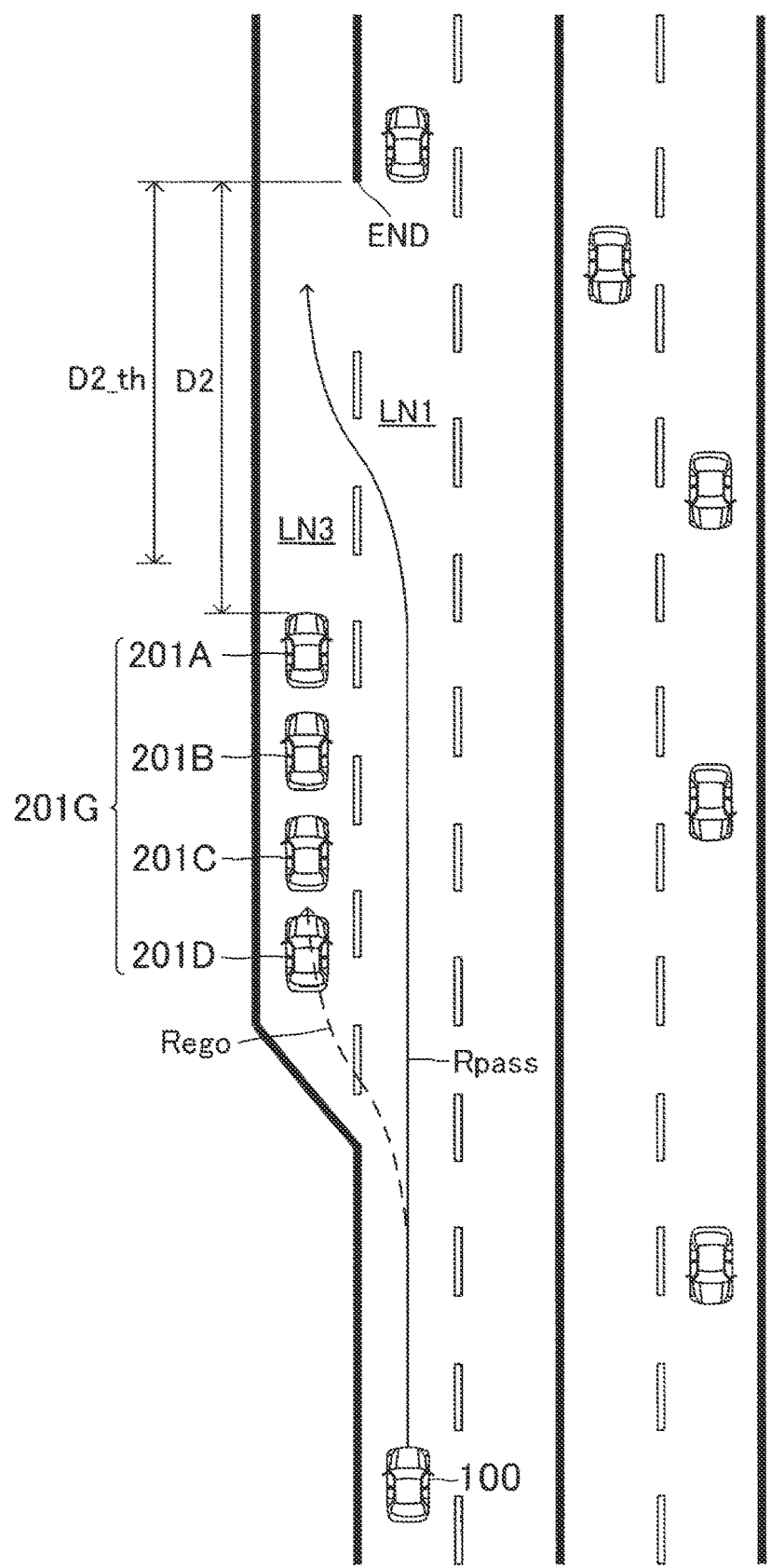
FIG. 7 is a diagram showing a scene in which there is a line of cars that are stopped or traveling at an extremely low speed in the branch lane ahead of the own vehicle.

The fourth condition Cx_4 is, as shown in FIG. 7, when the travel route Rego of the own vehicle 100 is a route entering a branch lane LN3 branching from the travel lane LN1 of the own vehicle 100, and the convoy 201G exists on the travel route Rego of the own vehicle 100 when the distance (entrance distance Dent) between the entrance of the branch lane LN3 and the own vehicle 100 becomes equal to or less than a predetermined distance (predetermined entrance distance Dent_th). There is no other vehicle on the traveling route Rego within a first distance D1_th ahead of the leading vehicle 201A of the convoy 201G, and the distance from the leading vehicle 201A of the convoy 201G to the end point END of the connection between the branch lane LN3 and the travel lane LN1 (entrance end point D2) is greater than or equal to the second distance D2_th.

In this example, the second distance D2_th is set to a sufficient distance to allow the own vehicle 100 to change lanes from the travel lane LN1 or the adjacent lane LN2 and safely enter the branch lane LN3.

More specifically, in this example, the second distance D2_th is set based on the current vehicle speed Vego and the control yaw angle $\theta$ corresponding to the vehicle speed Vego (D2=f2(Vego, $\theta$)). The second distance D2_th is also set to a larger value as the vehicle speed Vego increases. The second distance D2_th is set to a larger value as the control yaw angle $\theta$ is smaller.

When the vehicle traveling assistance device 10 determines "Yes" in S305, the process proceeds to S310 and sets the overtaking approach route Rpass as the driving route Rego.

When the vehicle traveling assistance device 10 determines in S305 that the overtaking entry condition Cx is satisfied because the first condition Cx_1 is satisfied, the vehicle traveling assistance device 10 sets an overtaking entry route Rpass for allowing the own vehicle 100 to enter in front of the preceding vehicle 201D after the preceding vehicle 201D is overtaken, as the traveling route Rego of the own vehicle 100. More specifically, in this example, the vehicle traveling assistance device 10 sets the overtaking approach route Rpass through which the own vehicle 100 enters the travel lane LN1 in front of the preceding vehicle 201D after the own vehicle 100 changes lanes from the travel lane LN1 to the adjacent lane LN2 to overtake the preceding vehicle 201D as the driving route Rego.

Further, when the vehicle traveling assistance device 10 determines in S305 that the overtaking entry condition Cx is satisfied because the second condition Cx_2 is satisfied, the vehicle traveling assistance device 10 sets the overtaking entry route Rpass for allowing the own vehicle 100 to enter in front of the leading vehicle 201A of the convoy 201G as the traveling route Rego of the own vehicle 100 after the convoy 201G is overtaken. More specifically, in this example, the vehicle traveling assistance device 10 sets, as the driving route Rego, the overtaking approach route Rpass through which the own vehicle 100 enters the travel lane LN1 in front of the leading vehicle 201A of the vehicle 201G after the own vehicle 100 changes lanes from the travel lane LN1 to the adjacent lane LN2 to overtake the convoy 201G.

When the vehicle traveling assistance device 10 determines in S305 that the overtaking entry condition Cx is satisfied because the third condition Cx_3 is satisfied, the vehicle traveling assistance device 10 sets the overtaking entry route Rpass for allowing the own vehicle 100 to enter in front of the preceding vehicle 201D after the preceding vehicle 201D is overtaken as the traveling route Rego. More specifically, in this example, when the vehicle traveling assistance device 10 determines in S305 that the overtaking entry condition Cx is satisfied because the third condition Cx_3 is satisfied, and the preceding vehicle 201D is present in the branch lane LN3, the own vehicle 100 travels in the travel lane LN1 and overtakes the preceding vehicle 201D, and then the own vehicle 100 enters in front of the preceding vehicle 201D. Set Rpass as the travel route Rego. On the other hand, when the vehicle traveling assistance device 10 determines in S305 that the overtaking entry condition Cx is satisfied because the third condition Cx_3 is satisfied, and the preceding vehicle 201D is in the travel lane LN1 of the own vehicle 100, the own vehicle 100 changes lanes to the adjacent lane LN2 and overtakes the preceding vehicle 201D existing in the travel lane LN1, and then the own vehicle 100 advances in front of the preceding vehicle 201D. Then, the overtaking approach route Rpass entering the branch lane LN3 is set as the driving route Rego.

Further, when the vehicle traveling assistance device 10 determines in S305 that the overtaking entry condition Cx is established because the fourth condition Cx_4 is established, the own vehicle 100 sets the overtaking entry route Rpass through which the own vehicle 100 enters in front of the leading vehicle 201A of the convoy 201G after the own vehicle 100 overtakes the convoy 201G as the traveling route Rego. More specifically, in this example, when the vehicle traveling assistance device 10 determines in S305 that the overtaking entry condition Cx is satisfied because the fourth condition Cx_4 is satisfied, and all the vehicles in the convoy 201G are present in the branch lane LN3, the own vehicle 100 travels in the travel lane LN1 to overtake the convoy 201G, and then the own vehicle 100 moves to the leading vehicle 201A of the convoy 201G. A forward approaching route Rpass is set as a driving route Rego. On the other hand, when the vehicle traveling assistance device 10 determines in S305 that the overtaking entry condition Cx is satisfied because the fourth condition Cx_4 is satisfied, and some of the vehicles in the convoy 201G are present in the travel lane LN1 of the own vehicle 100 and the remaining vehicles of the convoy 201G are present in the branch lane LN3, the own vehicle 100 changes lanes to the adjacent lane LN2 and the convoy 201G existing in the travel lane LN1. After overtaking the vehicle of the convoy 201G, the overtaking approach route Rpass through which the own vehicle 100 enters in front of the leading vehicle 201A of the convoy 201G is set as the traveling route Rego. On the other hand, when the vehicle traveling assistance device 10 determines in S305 that the overtaking entry condition Cx is satisfied because the fourth condition Cx_4 is satisfied and all the vehicles in the convoy 201G are present in the travel lane LN1 of the own vehicle 100, the vehicle traveling assistance device 10 causes the own vehicle 100 to enter in front of the leading vehicle 201A of the convoy 201G after the own vehicle 100 changes lanes to the adjacent lane LN2 and overtakes the vehicles of the convoy 201G existing in the travel lane LN1, and then sets, as a travel route Rego, an overtaking approach route Rpass in which the own vehicle 100 is caused to enter the branch lane LN3.

Next, the vehicle traveling assistance device 10 advances the process to S315, and presents the driver with the overtaking approach route Rpass set in S310.

As shown in FIG. 1, the own vehicle 100 is equipped with a presentation device 60. The presentation device 60 has a display 61 and a speaker 62. The display 61 and speaker 62 are electrically connected to the ECU 90. The ECU 90 (that is, the vehicle traveling assistance device 10) can display various images on the display 61 and output various sounds from the speaker 62.

The vehicle traveling assistance device 10 presents the overtaking approach route Rpass by displaying an image on the display 61 and/or outputting audio from the speaker 62.

Next, the vehicle traveling assistance device 10 advances the process to S320, and determines whether the approval condition Cy is satisfied.

Approval condition Cy is a condition that travel of own vehicle 100 along overtaking approach route Rpass is approved.

As shown in FIG. 1, the own vehicle 100 is equipped with an approval operation device 70 such as an approval button. The approval operation device 70 is electrically connected to the ECU 90. The approval operation device 70 is a device operated by the driver. The ECU 90 (that is, the vehicle traveling assistance device 10) determines that traveling of the own vehicle 100 along the overtaking route Rpass is approved when the approval operation device 70 is operated when the overtaking route Rpass is presented.

When the vehicle traveling assistance device 10 determines "Yes" in S320, the vehicle traveling assistance device 10 advances the process to S325 and performs overtaking approach driving. That is, the vehicle traveling assistance device 10 automatically or autonomously causes the own vehicle 100 to travel along the overtaking approach route Rpass set in S310.

Then, the vehicle traveling assistance device 10 advances the process to S395, and once ends the process of this routine.

When the vehicle traveling assistance device 10 determines "No" in S305 or S320, the vehicle traveling assistance device 10 directly advances the processing to S395, and once ends the processing of this routine.

The above is the operation of the vehicle traveling assistance device 10.

Even if there is a stopped vehicle or the preceding vehicle 201D or a convoy 201G traveling at an extremely low speed on the travel route Rego of the own vehicle 100, if there is a sufficient space in front of the preceding vehicle 201D or the leading vehicle 201A of the convoy 201G for the own vehicle 100 to pass, the own vehicle 100 is caused to overtake the preceding vehicle 201D or the leading vehicle 201A of the convoy 201G and enter the space in front of the preceding vehicle 201D or the leading vehicle 201A of the convoy 201G. In this way, the own vehicle 100 can continue to travel without stopping the own vehicle 100 or without decelerating the own vehicle 100 to an extremely low speed.

According to the vehicle traveling assistance device 10, when the preceding vehicle 201D or the convoy 201G of the plurality of vehicles 201A to 201D traveling at a traveling speed Vpre equal to or lower than the predetermined speed Vth exists on the traveling route Rego of the own vehicle 100, if there is no other vehicle on the traveling route Rego within the first distance D1_th ahead of the preceding vehicle 201D or the leading vehicle 201A of the convoy 201G, the preceding vehicle 201D or After overtaking the leading vehicle 201A, a route (overtaking approach route Rpass) for causing the own vehicle 100 to enter in front of the preceding vehicle 201D or the leading vehicle 201A is set as a travel route Rego. Therefore, by causing the own vehicle 100 to travel along the travel route Rego thus set, the own vehicle 100 can continue traveling without stopping the own vehicle 100 or decelerating the own vehicle 100 to an extremely low speed when there is a stopped vehicle or a vehicle traveling at an extremely low speed on the travel route Rego of the own vehicle 100.

The present disclosure is not limited to the above embodiment, and various modifications can be adopted within the scope of the present disclosure.

For example, the vehicle traveling assistance device 10 may be configured to execute the routine shown in FIG. 3 when the vehicle traveling assistance device 10 does not execute the follow-up driving control, and accordingly the driver is performing the driving operation of the own vehicle 100. Furthermore, in this case, the vehicle traveling assistance device 10 may be configured to omit S320 and S325 of the routine shown in FIG. 3 and only present the driving route Rego to the driver.

According to this, after the travel route Rego is set, the travel route Rego is presented to the driver of the own vehicle 100. Therefore, the driver of the own vehicle 100 can know the set travel route Rego, and by making the own vehicle 100 travel along the travel route Rego, the own vehicle 100 can continue traveling without stopping the own vehicle 100 or without decelerating the own vehicle 100 to an extremely low speed when there is a stopped vehicle or a vehicle traveling at an extremely low speed on the travel route Rego of the own vehicle 100.

Also, the example described above is an example in which a vehicle exists on the travel route Rego of the own vehicle 100, but the present disclosure can also be applied when an object other than a vehicle exists on the travel route Rego of the own vehicle 100.

What is claimed is:

1. A vehicle traveling assistance device equipped with a control device that sets a travel route of an own vehicle, wherein the control device is configured to, when a preceding vehicle or a train of a plurality of vehicles including the preceding vehicle, traveling immediately ahead of the own vehicle at a traveling speed no greater than a predetermined speed, is present on a traveling route of the own vehicle, and further no other vehicle is traveling on the traveling route within a range of a first distance forward from the preceding vehicle or a leading vehicle of the train of a plurality of vehicles, set, as the travel route, a route in which, after overtaking the preceding vehicle or the leading vehicle, the own vehicle enters ahead of the preceding vehicle or the leading vehicle, wherein the control device is configured to, when the travel route is a route entering a branch lane branching from a travel lane in which the own vehicle is traveling and a distance between an entrance of the branch lane and the own vehicle becomes no greater than a predetermined entry distance, the preceding vehicle or the train of a plurality of vehicles is present on the travel route, and further no other vehicle is present on the travel route within the range of the first distance ahead of the preceding vehicle or the leading vehicle of the train of a plurality of vehicles, and a distance between the preceding vehicle or the leading vehicle and an end point of a connection portion of the branch lane and the travel lane is a second distance or more, set, as the travel route, a route in which, after overtaking the preceding vehicle or the leading vehicle, the own vehicle enters ahead of the preceding vehicle or the leading vehicle.

\* \* \* \* \*